(12) United States Patent
Goel et al.

(10) Patent No.: US 7,237,239 B1
(45) Date of Patent: Jun. 26, 2007

(54) AVAILABILITY AND CONSISTENT SERVICE SEMANTICS IN A LOAD BALANCED COLLECTION OF SERVICES RUNNING DIFFERENT INSTANCES OF AN APPLICATION

(75) Inventors: Atul Goel, Santa Clara, CA (US); Paul Eastham, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 642 days.

(21) Appl. No.: 10/229,247

(22) Filed: Aug. 26, 2002

(51) Int. Cl.
  G06F 9/44 (2006.01)
  G06F 9/46 (2006.01)
  G06F 15/00 (2006.01)
  G06F 17/00 (2006.01)
  G06F 12/00 (2006.01)
  G06F 17/30 (2006.01)

(52) U.S. Cl. ...................... 717/170; 717/120; 717/121; 717/122; 717/168; 718/105; 715/511; 707/203

(58) Field of Classification Search ................ 718/105; 717/120–122, 168, 170, 174; 707/203; 715/511
  See application file for complete search history.

(56) References Cited

U.S. PATENT DOCUMENTS

| | | | |
|---|---|---|---|
| 6,092,178 A * | 7/2000 | Jindal et al. ................... 712/27 |
| 6,185,734 B1 * | 2/2001 | Saboff et al. ................ 717/164 |
| 6,195,696 B1 | 2/2001 | Baber et al. |
| 6,658,659 B2 * | 12/2003 | Hiller et al. ................. 717/170 |
| 6,754,717 B1 * | 6/2004 | Day et al. .................... 709/248 |
| 6,826,750 B1 * | 11/2004 | Curtis et al. ................. 717/170 |
| 2003/0159135 A1 * | 8/2003 | Hiller et al. ................. 717/166 |

OTHER PUBLICATIONS

Jeremy Elson, et al., *ICAP, the Internet Content Adaptation Protocol*, The ICAP Protocol Group, Jun. 2001, pp. 1-30. .circlemud.org/~jelson/icap-1.72.txt.

* cited by examiner

*Primary Examiner*—William Thomson
*Assistant Examiner*—Qing-Yuan Wu
(74) *Attorney, Agent, or Firm*—Blakely Sokoloff Taylor & Zafman LLP

(57) ABSTRACT

In one embodiment, a method for providing consistent services semantics for multiple services running different instances of an application comprises maintaining, at a network node, data identifying current application versions associated with the multiple services, and selecting, at the network node, a new preferred application version based on the data identifying current application versions upon detecting a predefined event pertaining to the multiple services. The method further comprises identifying, at the network node, services that run the new preferred application version, and balancing the distribution of requests between the services that run the new preferred application version until detecting a next predefined event.

42 Claims, 7 Drawing Sheets

AVAILABILITY AND CONSISTENT SERVICE SEMANTICS IN A LOAD BALANCED COLLECTION OF SERVICES RUNNING DIFFERENT INSTANCES OF AN APPLICATION

FIELD OF THE INVENTION

The present invention pertains to devices which balance the distribution of requests between multiple services. More particularly, the present invention relates to a method and apparatus for providing consistent service semantics for multiple services running different instances of a content adaptation application.

BACKGROUND OF THE INVENTION

Of the many uses of the Internet, one of the more common ones is to access content on a remote server, such as a World Wide Web server. Typically, a person operates a client device to access content on a remote origin server over the Internet. The client may be, for example, a personal computer (PC) or a handheld device such as a personal digital assistant (PDA) or cellular telephone. A person using the client typically operates a browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

For a variety of reasons, it may be desirable to place a device known as a proxy logically between the client and the origin server. For example, organizations often use a proxy to provide a barrier between clients on their local area networks (LANs) and external sites on the Internet by presenting only a single network address to the external sites for all clients. A proxy normally forwards requests it receives from clients to the applicable origin server and forwards responses it receives from origin servers to the appropriate client. A proxy may provide authentication, authorization and/or accounting (AAA) operations to allow the organization to control and monitor clients' access to content.

It is also common for a proxy to operate as a cache of content that resides on origin servers; such a device may be referred to as a "proxy cache". An example of such a device is the NetCache product designed and manufactured by Network Appliance, Inc. of Sunnyvale, Calif. The main purpose of caching content is to reduce the latency associated with servicing content requests. By caching certain content locally, the proxy cache avoids the necessity of having to forward every content request over the network to the corresponding origin server and having to wait for a response. Instead, if the proxy cache receives a request for content which it has cached, it simply provides the requested content to the requesting client (subject to any required authentication and/or authorization) without involving the origin server.

Proxy caches may also be used to facilitate transformations of the requested content prior to returning the requested content to the requesting client. Examples of such transformations include translation of web pages retrieved from the origin server to different formats depending on the client device type (e.g., a PDA, a cellular telephone, etc.), translation of web pages to different human languages, insertion of advertisements into web pages, checking web pages for viruses, etc. For each type of transformation, a proxy cache may balance the distribution of content transformation tasks associated with numerous client requests between a collection of services running multiple instances of a designated content adaptation application.

Often, a group of servers is deployed to implement content adaptation, and each server may run one or more independent instances of a particular service. Because each service within the collection of services (also known as a service farm) is independent, it is possible that, at a given point of time, the services within the service farm may be running different versions of the application. Specifically, the existence of multiple versions within the service farm may be caused by administrative and management tasks which upgrade and downgrade services, add new services that run an application version other than that of the existing services, modify service configurations (e.g., an addition of virus signatures to a virus checking service), modify data used by a service (e.g., a content filtering application uses a database which is periodically refreshed by downloading it from a particular server), etc.

Content transformations performed by services running different versions of the same application may result in inconsistent semantics of a content adaptation process as a whole. For example, when services within a service farm execute different versions of the same application, they provide different transformation results of the same content to the clients, resulting in inconsistencies across clients. Further, a web page including multiple objects may itself appear inconsistent since its constituent objects may be transformed by different versions of a content adaptation application.

One known solution for the above problems involves taking the entire service farm offline or taking each service offline in sequence when performing administrative and management tasks causing version modifications. However, this approach decreases the availability of content adaptation services, which may not be acceptable if the services run a critical application such as virus checking. In addition, because these administrative and management tasks are typically time-consuming, the above approach may result in severe performance degradation. Further, the above approach requires manual intervention when taking services offline, which may not always be possible (e.g., in case of automated database downloads by content filtering services).

Another existing approach for solving the above problems involves implementing, on a service farm, a mechanism preventing different versions of a content adaptation application to be simultaneously active. However, this approach typically requires that services within the farm run cluster management protocols, thus incurring extra network overhead in the form of maintaining group membership information. As a farm scales, the network bandwidth overhead can be substantial. Furthermore, network conditions such as network partitioning can divide a farm into multiple independent islands in which services can run different application versions, thus making this solution futile.

SUMMARY OF THE INVENTION

The present invention includes a method and apparatus for providing consistent service semantics for multiple services running different instances of a content processing application. The method comprises maintaining, at a network node, data identifying current application versions associated with the multiple services, and selecting, at the network node, a new preferred application version based on the data identifying current application versions upon detecting a predefined event indicating a change in operation of any service. The method further comprises identifying, at the network node, services that run the new preferred application version, and balancing the distribution of requests between the services that run the new preferred application version until detecting a next predefined event.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
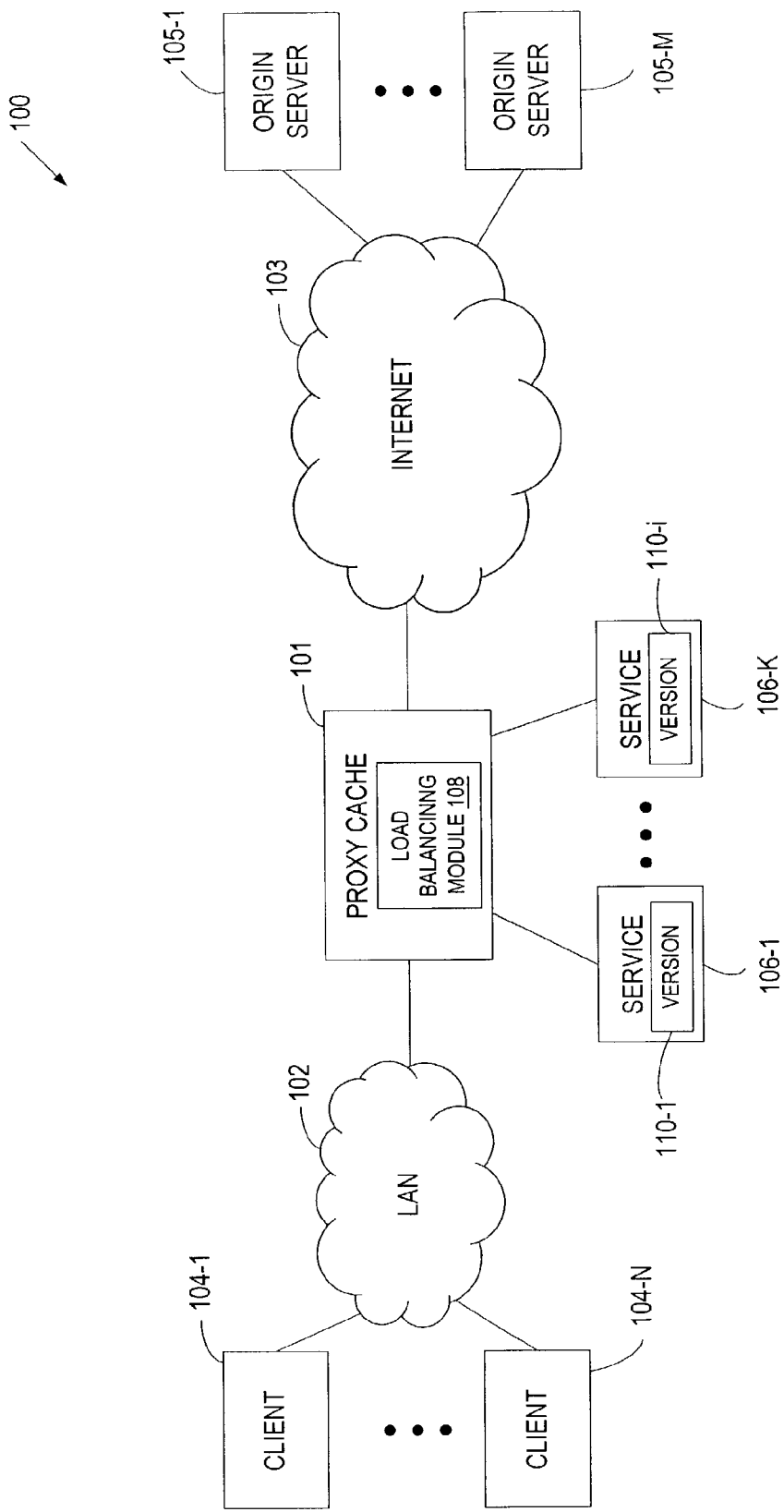
FIG. 1 illustrates a network environment in which a present invention may be implemented.

Methods and apparatus for providing consistent service semantics for multiple services running different instances of a content processing application are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, a load balancing node communicates with multiple services running different instances of a content adaptation application (e.g., a language translation application) and maintains a current list of application versions associated with the multiple services. One version is selected from the current list of application versions as a preferred application version. In one embodiment, the preferred application version is a version that is run by the maximum number of services that are currently in the active state. Based on the preferred application version, the load balancing node defines a set of participating services which includes services that are currently active and are running the preferred application version. The load balancing node balances the distribution of content processing requests between the services included in the set of participating services. Each time an application version run by any service is modified or the state of any service changes, a new preferred application version is selected and the set of participating services is updated to include the services that are active and are running the new preferred application version.

As will become more apparent from the description which follows, the described technique provides consistent semantics of a content adaptation process as a whole by ensuring that content processing requests are forwarded to services running a single version of a content adaptation application. The described technique allows for maximum availability of services and minimum performance degradation when services' upgrades/downgrades and configuration changes occur. In addition, a single service or a group of services can be added or deleted dynamically, and newly added services can run an application version that is different from application versions run by existing services. With the present technique, services' upgrades/downgrades and configuration changes do not require any additional manual intervention or cluster management support within the collection of services. Further, the present technique can be used in a loosely coupled cluster of services, allowing independent administration of each service and placing no restrictions on the location of services with respect to each other. Moreover, the described technique incurs only small computational and network overheads and scales well as the number of services increases.

FIG. 1 illustrates a network environment 100 in which a present invention may be implemented. As illustrated, a proxy cache 101 is connected between a LAN 102 and the Internet 103. A number (N) of clients 104-1 through 104-N are coupled to the LAN 102. A number (M) of origin services 105-1 through 105-M are coupled to the Internet 103. The proxy cache 101 forwards requests from the clients 104 for content residing on the origin servers 105 and forwards content and/or other responses from the origin servers 105 to the appropriate clients 104.

Prior to being transferred to the appropriate clients 104, content retrieved from the origin servers 105 may need to be transformed using a service from a number (K) of services 106-1 through 106-K. The services 106 run multiple instances of a designated application (e.g., a language translation application). These multiple instances may run a number (I) of application versions 110-1 through 110-I. The existence of multiple versions 110 within the collection of services 106 may be caused by administrative and management tasks which upgrade and downgrade services, add new services, modify service configurations (e.g., an addition of virus signatures to a virus checking service), modify data used by a service (e.g., a content filtering application uses a database which is periodically refreshed by downloading it from a particular server), etc.

The services 106 may run on the same machine or multiple machines. In one embodiment, the proxy cache 101 holds information about the machine and the port number on which each service 106 runs. In one embodiment, the collection of services 106 provides the abstraction of a single system (running a particular application) as a whole to the proxy cache 101.

The proxy cache 101 and each service 106 can communicate using any known in the art protocol that allows the proxy cache 101 and the service 106 to exchange web requests and responses. In some embodiments, the proxy cache 101 may communicate with the services 106 using the Internet content adaptation protocol (ICAP) defined by a draft standard that is being developed by the Internet Engineering Task Force (IETF). ICAP allows the proxy 101 operating as an ICAP client to send requests for transformations to the services 106 operating as ICAP servers and to receive transformed content from the services 106.

In one embodiment, the proxy cache 101 includes a load balancing module 108. Alternatively, the load balancing module 108 may reside on a remote server coupled to the proxy cache 101 and the services 106 via a network or any other communication link. The load balancing module 108 identifies one or more services (within the collection of services 106) that are to be used for load balancing and balances the distribution of content transformation requests associated with numerous client requests for content among the identified services.

Once the proxy cache 101 receives transformed content from the services 106, it provides the transformed content to the requesting clients 104. In addition, the proxy cache 101 may also cache the transformed content for servicing similar client requests issued in the future.

Note that a proxy cache can be used advantageously in network environments other than that shown in FIG. 1. For example, a proxy cache need not be used to couple clients on a LAN to the Internet. Next, one or more other types of networks may be substituted for either the LAN 102 or the Internet 103 in the configuration of FIG. 1.

Additionally, while the proxy cache 101 is described as being responsible for controlling transformations of content, it will be appreciated by those skilled in the art that this functionality can be performed by any other network device (e.g., the origin server 105 or any other network device not shown in FIG. 1) which may have a load balancing module such as the load balancing module 108 for balancing the distribution of requests between a collection of services such as the services 106. Furthermore, although some embodiments of the present invention are described in the context of content transformations and caching, it will be appreciated by those skilled in the art that the embodiments of the present invention can be used in any other environment to provide consistent behavior of a collection of services running different versions of an application of any type.

Figure 2:
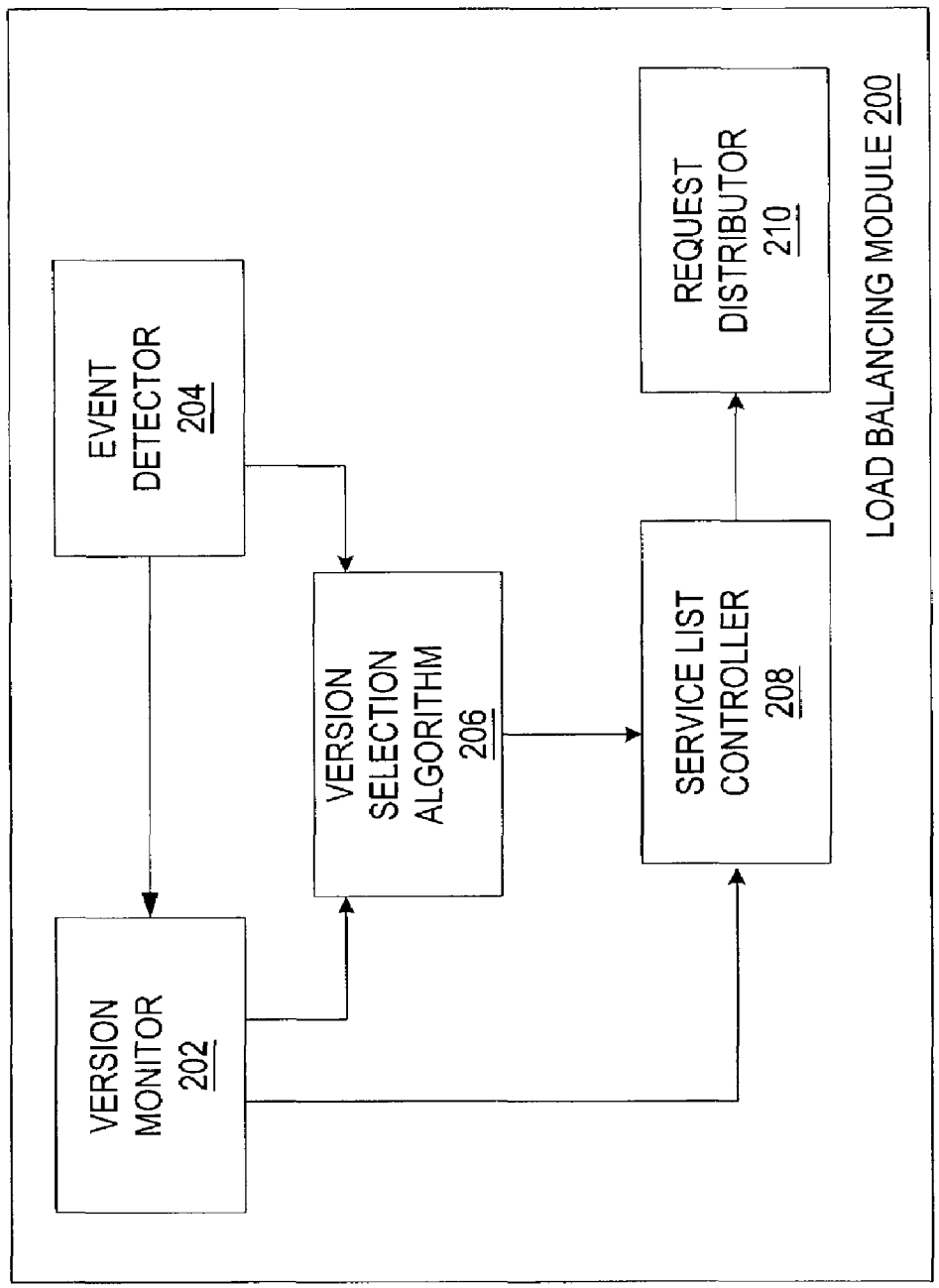
FIG. 2 illustrates a block diagram of components of a load balancing module, according to one embodiment.

FIG. 2 illustrates a block diagram of components of a load balancing module 200, according to one embodiment. The load balancing module 200, which may be representative of the load module 108 in FIG. 1, includes a version monitor 202, an event detector 204, a version selection algorithm 206, a service list controller 208, and a request distributor 210. Note that each of these elements can be embodied in either hardware, software, or a combination thereof. For example, each of these modules could be embodied as one or more hardwired integrated circuit (IC) devices, such as application specific integrated circuits (ASICs), gate arrays, programmable logic devices (PLDs), or the like. To facilitate description, however, it is henceforth assumed in this description that these elements are software modules that are executed by a programmable microprocessor or controller within the proxy cache 200.

The event detector 204 is responsible for receiving data from a collection of services running multiple instances of an application and detecting predefined events pertaining to the collection of services. These predefined events may include, for example, a change of an application version run by any service and a change in the state of a service (e.g., the service's transition from the inactive state (the down state) into the active state (the up state)). The event detector 204 detects the predefined events using data received from the services. For example, the event detector 204 may determine that an application version of a service has changed upon receiving a current version identifier from the service and detecting that this current version identifier does not match a previously-recorded version identifier. Further, the event detector 204 may determine that a service has transitioned from the active state into the inactive state upon detecting that the service has failed to respond to several network packets sent by the event detector 204 to the service.

The event detector 204 notifies the version monitor 202 when an application version of a service changes and/or a service transitions into a different state. The version monitor 202 utilizes the information received from the event detector 204 to maintain a current list of application versions run by the collection of services. In one embodiment, the version monitor 202 is also responsible for maintaining a list of currently active services (services that are presently up).

The version selection algorithm 206 is responsible for selecting a preferred application version from the current list of application versions. The preferred application version is used to identify services that will participate in future load balancing. In one embodiment, the preferred application version is a version run by a majority of services. In another embodiment, the preferred application version is a version having a maximum number of votes, which is determined by a voting algorithm discussed in more detail below.

The service list controller 208 is responsible for maintaining a list of participating services (i.e., the services that will be used for load balancing) and a list of non-participating services (i.e., the services that will not be used for load balancing). The list of participating services includes each service that runs the preferred application version and is in the active state. The list of non-participating services includes all services from the collection of service that are not contained in the list of participating services.

The request distributor 210 is responsible for balancing the distribution of content processing requests among the participating services.

Figure 3:
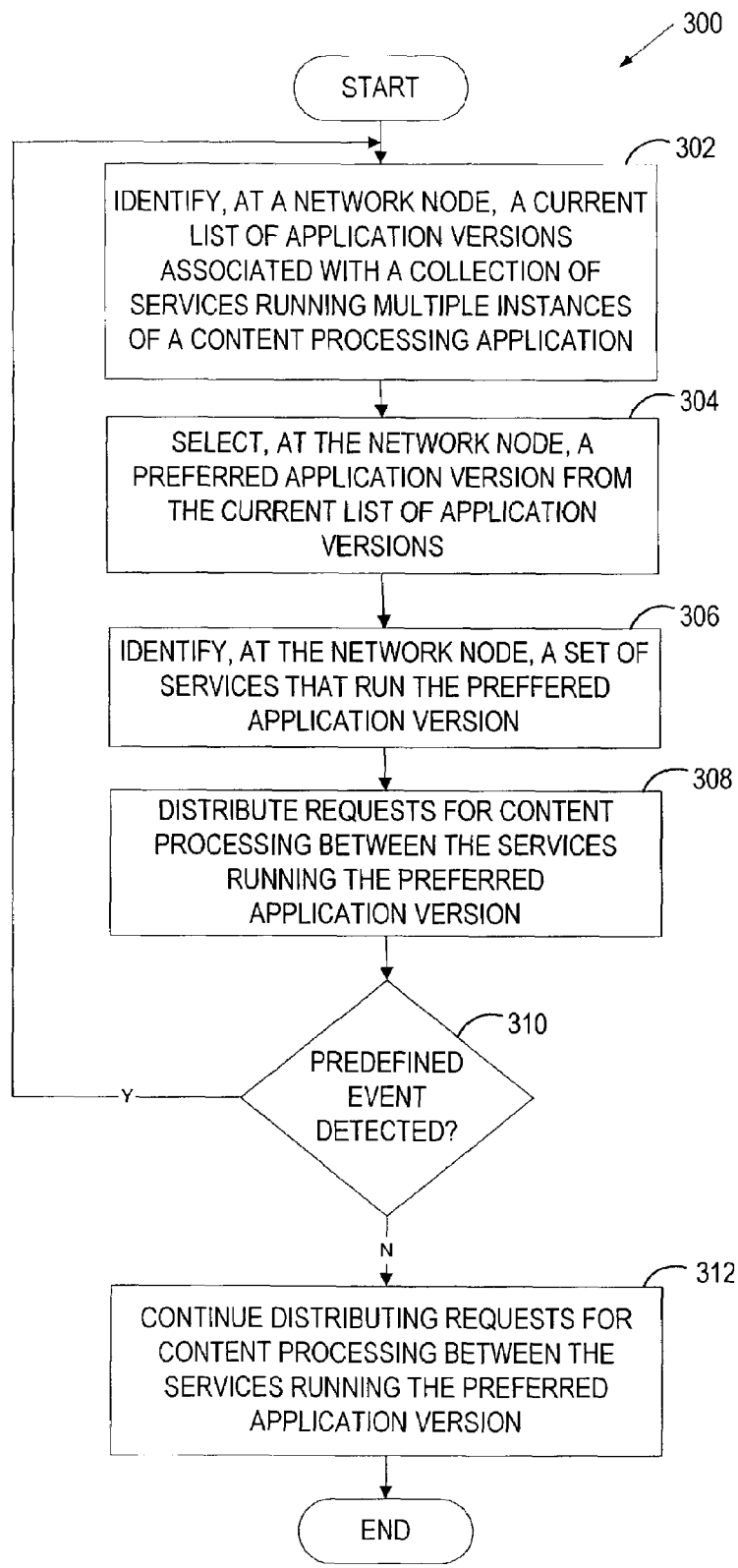
FIG. 3 is a flow diagram of a method for distributing content processing requests between multiple services running various instances of a content adaptation application, according to one embodiment.

FIG. 3 is a flow diagram of a method 300 for distributing content processing requests between multiple services running various instances of a content adaptation application, according to one embodiment of the present invention. Initially, the version monitor 202 identifies a current list of application versions associated with a collection of services running various instances of a content processing application (processing block 302). The content processing application may be, for example, a language translation application, a format translation application, an ad-insertion application, etc. One embodiment of a process for maintaining a current list of application versions and a list of currently active services will be described in greater detail below in conjunction with FIG. 4.

At processing block 304, the version selection algorithm 206 selects a preferred application version from the current list of application versions. In one embodiment, the preferred application version is a version run by a majority of services that are in the active state. In another embodiment, the preferred application version is a version having a maximum number of votes as will be discussed in more detail below in conjunction with FIG. 5.

Next, the service list controller 208 identifies services in the active state that run the preferred application version (processing block 306) and includes them into a list of participating services. The request distributor 210 uses the list of participating services when performing load balancing by distributing content processing requests across the participating services (processing block 308).

While the requests are distributed between the participating services, a determination is periodically made as to whether a predefined event indicating a change in the operation of any service has been detected (decision box 310). A predefined event may represent, for example, a change of an application version run by a service or a change in the state of a service. If a predefined event is not detected, the request distributor 210 continues distributing content processing events between the participating services. Once the event detector 204 detects a predefined event, it triggers re-execution of processing blocks 302 through 308 based on the current conditions, resulting in a modified list of participating services which is then used for distributing new content processing requests.

Accordingly, the content processing requests are always sent to the services that run the same version of a content processing application, ensuring consistent semantics of a content adaptation process as a whole and providing consistency across clients and within a single document such as a web page.

Figure 4:
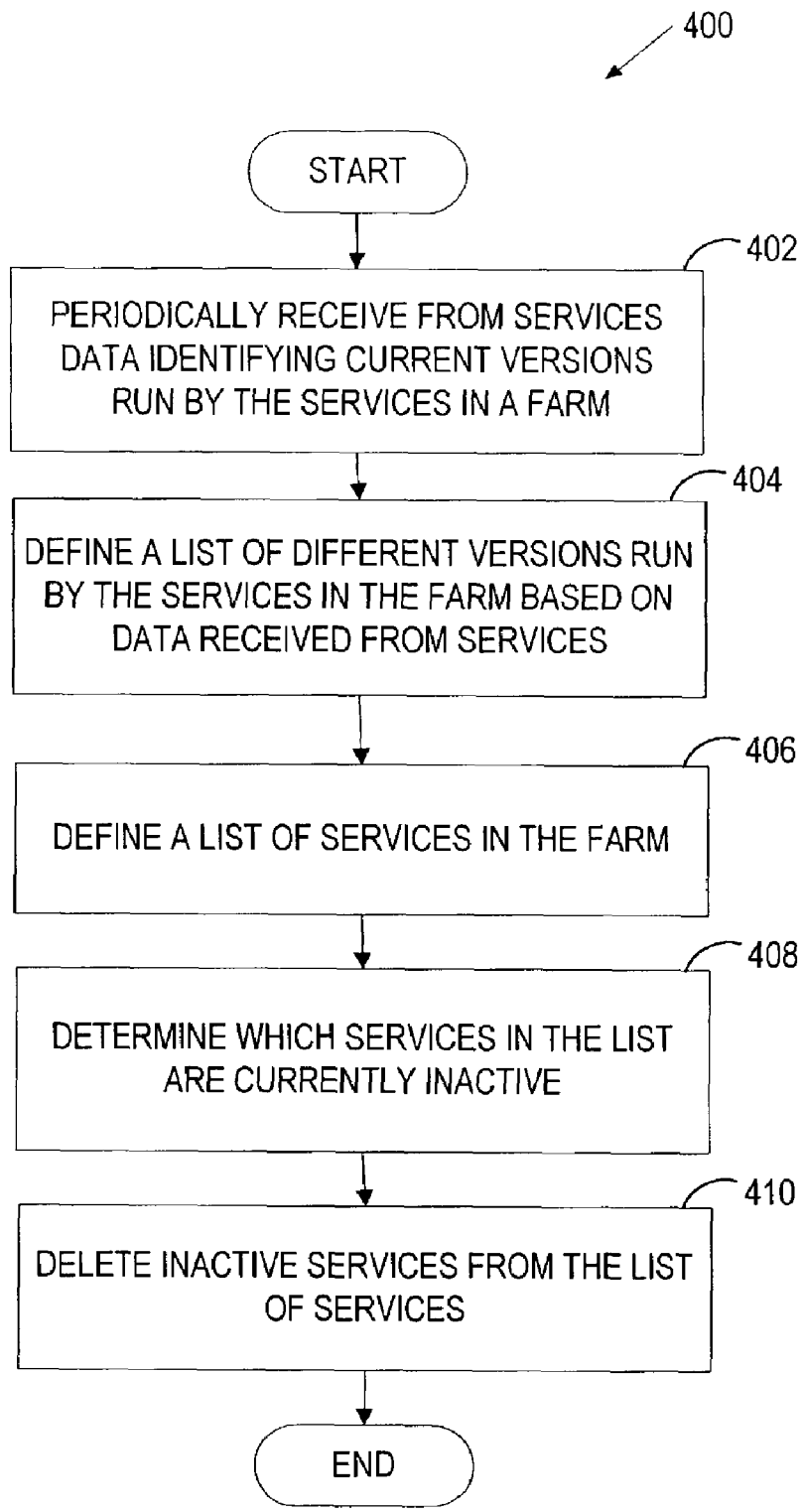
FIG. 4 is a flow diagram of a method for maintaining a current list of application versions run by a collection of services, according to one embodiment.

FIG. 4 is a flow diagram of a method 400 for maintaining a current list of application versions run by a collection of services, according to one embodiment of the present invention. At a given point of time, a collection of services (also known as a service farm) may include services that are currently up (the active state) and services that are currently down (inactive state). A service may be down due to a network partition, problems within the application version run by the service, etc.

Referring to FIG. 4, at processing block 402, data identifying current versions of services within the service farm is periodically received from the services. In one embodiment, in which communications with the services in the service farm are performed via the ICAP protocol, an ICAP service tag (ISTAG) is used to identify to an ICAP client (e.g., a proxy cache or a load balancing node) the version of the application running on the ICAP server representing a service within the service farm.

Based on the data received from the services, a current list of different application versions run by the services in the farm is defined (processing block 404). In one embodiment, the current list of application versions includes only the application versions of the services that are currently in the active state (the up state). A service is considered to be up if it responds to network packets forwarded to it.

In one embodiment, in which communications with the services in the service farm are performed via the ICAP protocol, an initialization and ICAP server configuration monitoring request known as OPTIONS is used to determine whether the service is up. An OPTIONS request is sent to an ICAP server by an ICAP client before sending any other requests to gather server configuration details. If the service responds with a valid OPTIONS response, the service is considered to be up. Subsequently, a service is considered to be in the UP state while the service's responses to network packets (either containing an OPTIONS request or the content to be transformed by the service) sent to the service are received. If the service stops responding to network packets forwarded to it, the service's transition into the inactive (down) state is assumed. However, such assumption is not made if an attempt to open a new connection (in addition to one or more currently opened connections) fails because this failure could occur due to the fact that the existing connections reached a maximum number of allowed connection at the ICAP server. In addition, the above assumption is not made if the response received from the server is truncated or contains some unrecognized data because this transformation of the response does not indicate the inability of the service to communicate. Further, the above assumption is not made until a certain number of retries was done (e.g., a number of network packets were sent and no response to any of these packets is received). These retries do not include the standard retries performed in accordance with a transport layer protocol (e.g., the transmission control protocol (TCP)) that may be in use.

The configuration details contained in an OPTIONS response received from the service include Options-TTL which indicates the time period for which the configuration details of an ICAP server remain valid. An ICAP client is expected to refresh the configuration details of an ICAP server by sending an OPTIONS request before the time period specified in Option-TTL expires. In one embodiment, the caching device tries to refresh configuration details for services that are in the down state by attempting to send OPTIONS requests at intervals more frequent than that specified by Options-TTL to detect changes in network connectivity as soon as possible. For example, the caching device can use a 10-second interval between OPTIONS requests. Once the caching device receives an OPTIONS response from the service, the service's transition from the down state into the up state is recorded.

Further referring to FIG. 4, method 400 continues at processing block 406 with defining a list of services within the service farm, determining, at processing block 408, which of these services are currently inactive as discussed above, and deleting, at processing block 410, inactive services from the list of services, thus defining a current list of services in the active state within the service farm.

Figure 5:
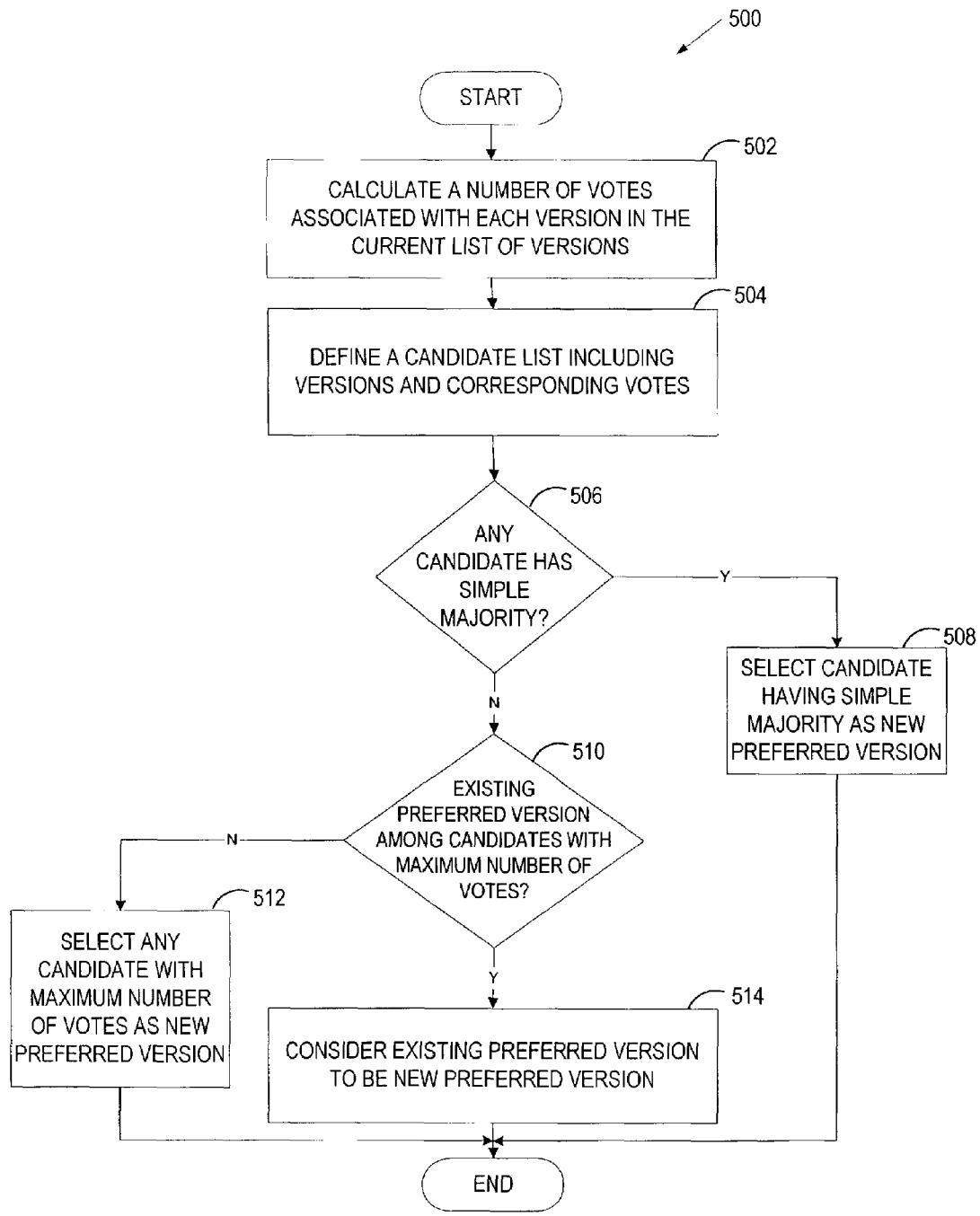
FIG. 5 is a flow diagram of a method for selecting a preferred application version, according to one embodiment of the present invention.

FIG. 5 is a flow diagram of a method 500 for selecting a preferred application version, according to one embodiment of the present invention. Method 500 is based on the assumption that in a service farm with mixed application versions, there is a tendency to stabilize towards one application version. Accordingly, the existence of multiple application versions is temporary and not permanent. Since a load balanced service farm provides the abstraction of a single system (running a particular application) as a whole, the above assumption is likely to be true.

Method 500 utilizes the current list of application versions and the current list of services in the active state that are defined as discussed above in conjunction with FIG. 4.

Referring to FIG. 5, method 500 begins with calculating, for each application version in the current list of application versions, a number of votes associated with this application version (processing block 502). In one embodiment, this calculation is done by accumulating votes assigned to each service from the current list of services that runs this specific application version. In one embodiment, each service in the active state is one vote. In other embodiments, different numbers of votes may be assigned to services depending on the hardware configuration and software resources available to the services. For example, a larger number of votes can be assigned to services that have greater availability characteristics and are capable of handling more loads.

At processing block 504, a candidate list is created. The candidate list includes application versions from the current list of application versions and their votes. The candidate list is organized in descending order by the number of votes.

Next, a determination is made as to whether any candidate in the candidate list has simple majority, i.e., whether any candidate has more votes than any other candidate in the list (decision box 510). If the determination is positive, the candidate having simple majority is selected as a new preferred application version (processing block 508). Otherwise, a resulting tie (i.e., more than one candidate in the candidate list has the maximum number of votes) is resolved by further determining whether the existing preferred application version is among the candidates that have the maximum number of votes (decision box 510). If the existing preferred application version is among the candidates with the maximum number of votes, the existing preferred application version becomes a new preferred application version (processing block 514). If the existing preferred application version is not among the candidates with the maximum number of votes, any candidate with the maximum number of votes is selected as a new preferred application version (processing block 512).

Based on the preferred application version determined using the voting algorithm, a list of participating services (which are in the active state and are running the preferred application version) and a list of non-participating services (which include all of the remaining services) are created. This choice of participating services ensures that at any given point in time the set of services used for load balancing runs the same version of the application.

With the voting algorithm, if all services within a service farm run the same version of an application, all the services will be included in the list of participating services, thus utilizing the services fully. The voting algorithm guarantees non-stop operation by ensuring that at least one service would always be selected, even in a highly unlikely situation in which each service in a service farm runs a different version of the application.

In addition, because the voting algorithm always selects a version with the maximum number of votes (which for similar services capabilities is typically a version run by the maximum number of services), maximum availability of services and minimum performance degradation are provided. Furthermore, considering that the number of different possible versions existing at the same time is expected to be small, choosing a version with the maximum number of votes allows administrative tasks to be performed seamlessly.

Figure 6:
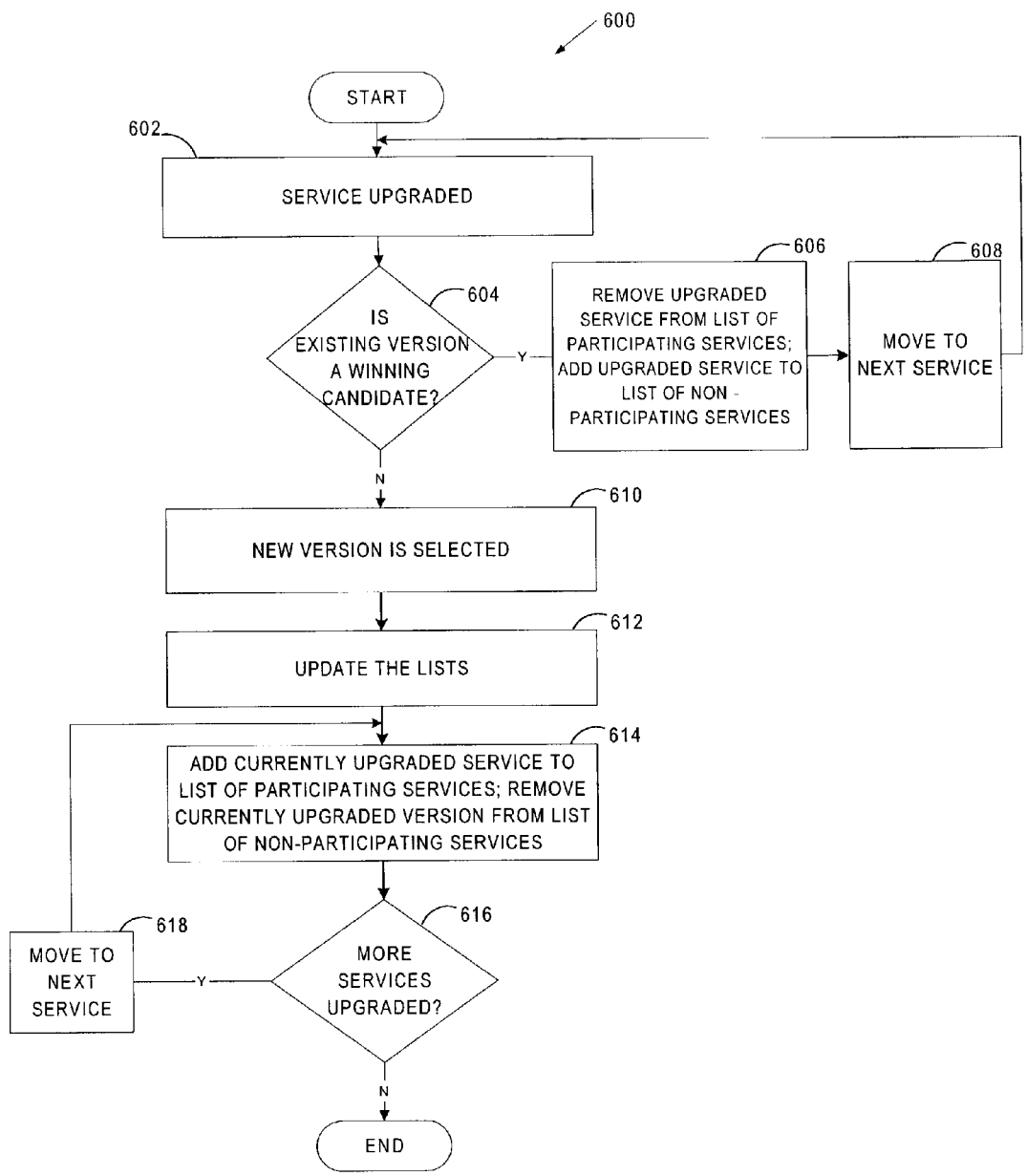
FIG. 6 is a flow diagram of a method for facilitating an upgrade of services within a service farm, according to one embodiment of the present invention.

FIG. 6 is a flow diagram of a method 600 for facilitating an upgrade of services within a service farm, according to one embodiment of the present invention.

Referring to FIG. 6, method 600 begins with detecting an upgrade of a first service in the service farm (processing block 602). Next, the voting algorithm is performed and a winning candidate is determined. If the existing version (i.e., the version before the upgrade) of the service farm is the winning candidate (decision box 604), the upgraded service will be removed from the current list of participating services and add to the current list of non-participating services (processing block 606). In one embodiment, the existing version will remain the winning candidate until more than half of services in the service farm are upgraded.

Once the voting algorithm selects a new version (i.e., the upgraded version) as a winning candidate, the upgraded services are placed on the list of participating services and start processing content adaptation requests, while services running the old version are placed on the list of non-participating services and stop processing new content adaptation requests (processing block 612 and 614). This pattern continues until all services are upgraded (decision box 616).

Figure 7:
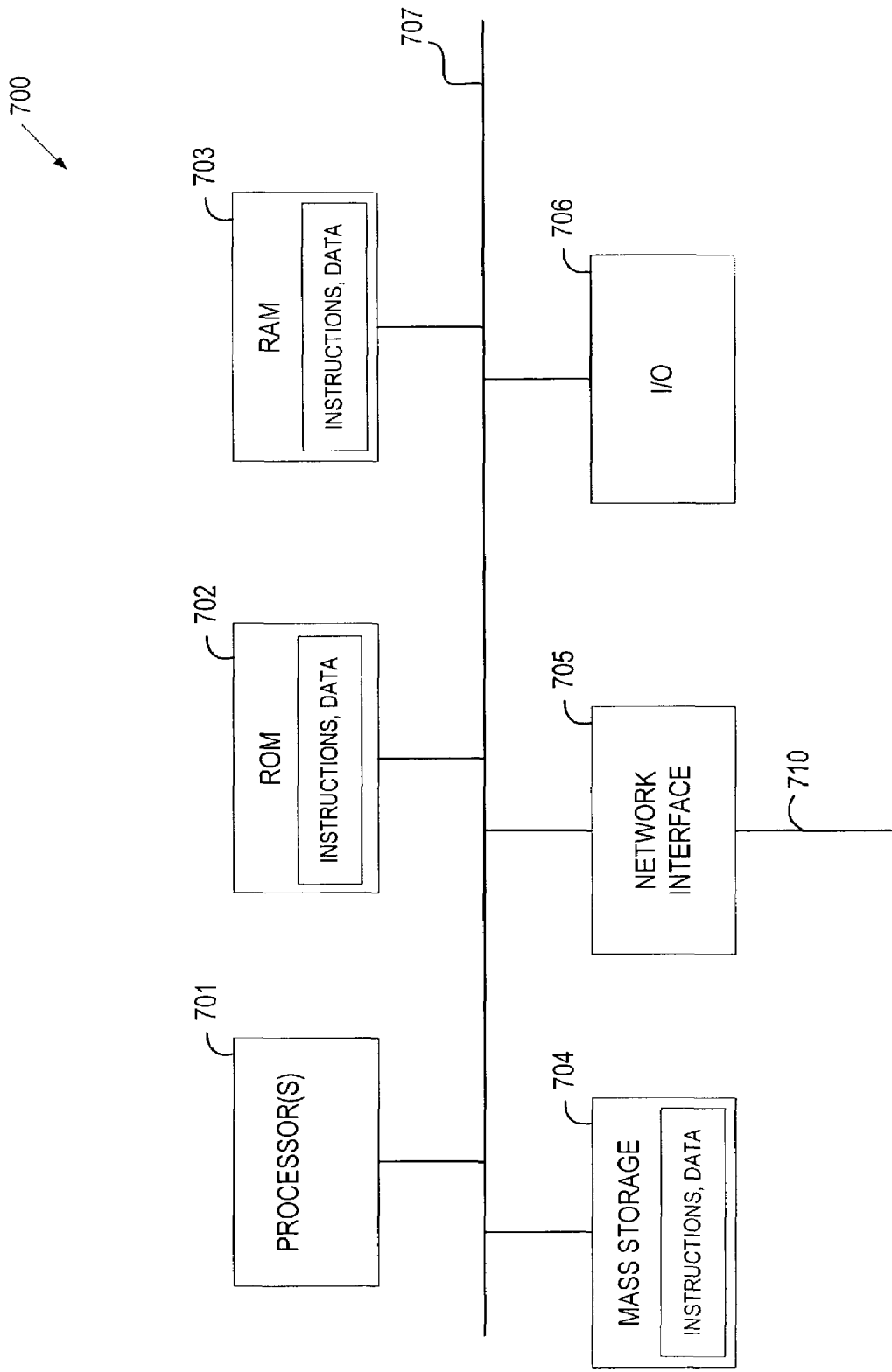
FIG. 7 is a block diagram showing an abstraction of hardware components of a proxy cache, according to one embodiment.

FIG. 7 is a block diagram showing an abstraction of hardware components of a proxy cache 700, according to one embodiment. Note that there are many possible implementations represented by this abstraction, which will be readily appreciated by those skilled in the art given this description.

The illustrated system includes one or more processors 701, i.e. a central processing unit (CPU), read-only memory (ROM) 702, and random access memory (RAM) 703, which may be coupled to each other by a bus system 707 and/or by direct connections. The processor(s) 701 may be, or may include, one or more programmable general-purpose of special-purpose microprocessors, digital signal processors (DSPs), programmable controllers, application specific integrated circuits (ASICs), programmable logic devices (PLDs), or a combination of such devices. The bus system (if any) 707 includes one or more buses or other connections, which may be connected to each other through various bridges, controllers and/or adapters, such as are well-known in the art. For example, the bus system 707 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 707 are one or more mass storage devices 704, a network interface 705, and one or more input/output (I/O) devices 706. Each mass storage device 704 may be, or may include, any one or more devices suitable for storing large volumes of data in a non-volatile manner, such as a magnetic disk or tap, magneto-optical (MO) storage device, or any of various forms of Digital Versatile Disk (DVD) or CD-ROM based storage, or a combination thereof. RAM 703 and/or the mass storage device(s) 704 may be used to implement a content cache for storing content cached by the proxy cache 101 of FIG. 1.

The network interface 705 is one or more data communication devices suitable for enabling the processing system to communicate data with remote devices and systems via an external communication link 710. Each such data communication device may be, for example, an Ethernet adapter, a Digital Subscriber Line (DSL), modem, a cable modem, an Integrated Services Digital Network (ISDN) adapter, a satellite transceiver, or the like. Referring again to the embodiment of FIG. 1, the network interface 705 is used by the proxy cache 101 to communicate both over the LAN 102 and over the Internet 103. In particular, the network interface 705 is the communications interface by which the proxy cache 101 receives and communicates requests and responses between clients and servers. In addition, the network interface 705 may also be the communications interface by which the proxy cache 101 communicates with the services 106. Note that while only one external communication link 710 is illustrated, separate physical communication links may be provided for each network connection (e.g., to LAN 102, Internet 103), although that is not necessarily the case.

Since proxy cache 101 may be accessed by a user via network interface 705, proxy cache 101 does not necessarily require its own I/O devices 706. Nonetheless, such I/O devices may be included in some embodiments and may include, for example, a keyboard or keypad, a display device, and a pointing device (e.g., a mouse, trackball, or touchpad).

As noted, the above-described processes and techniques (e.g., facilitating consistency of service semantics, selecting a preferred application version, maintaining a current list of participating services, etc.) may be implemented at least partially in software. Such software may be part of the operating system of the proxy cache 101. Such software may reside, either entirely or in part, in any of RAM 703, mass storage device(s) 704 and/or ROM 702. Such software may be executed by the processor(s) 701 to carry out the described processes and techniques.

Thus, a method and apparatus for providing consistent service semantics for a collection of services running multiple versions of an application have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   maintaining, at a network node, data identifying current application versions associated with a plurality of services running a plurality of instances of an application, each of the plurality of services being accessible to the network node via a network;
   selecting, at the network node, a new preferred application version based on the data identifying current application versions upon detecting a change of at least one of the plurality of services;
   identifying, at the network node, one or more of the plurality of services that run the new preferred application version; and
   balancing a distribution of requests between the one or more of the plurality of services that run the new preferred application version until detecting a next change of at least one of the plurality of services.

2. The method of claim 1 further comprising:
   receiving data identifying a current application version of each of the plurality of services.

3. The method of claim 1 wherein the data identifying current application versions includes a list of current application versions.

4. The method of claim 3 further comprising:
   including a current application version of said each of the plurality of services into the list of current application versions; and
   determining that said each of the plurality of services is in an active state.

5. The method of claim 4 wherein determining that said each of the plurality of services is in the active state comprises:
   sending a network packet to said each of the plurality of services; and receiving a response from said each of the plurality of services.

6. The method of claim 3 wherein selecting the new preferred application version further comprises:
   assigning one or more votes to each of the plurality of services that runs an application version from the list of current application versions and is currently in an active state;
   determining, for each application version within the list of current application versions, a total number of votes assigned to services associated with said each application version; and
   searching for a winning application version with a maximum number of corresponding votes.

7. The method of claim 6 further comprising:
   finding the winning application version; and
   considering the winning application version to be the new preferred application version.

8. The method of claim 6 further comprising:
   finding two or more winning application versions;
   determining whether an existing preferred application version is among the two or more winning application versions; and
   considering the existing preferred application version to be the new preferred application version if the existing preferred application version is among the two or more winning application versions.

9. The method of claim 8 further comprising:
   determining that the existing preferred application version is not among the two or more winning application versions; and
   considering any one of the two or more winning application versions to be the new preferred application version.

10. The method of claim 1 wherein the change comprises a change of an application version run by one of the plurality of services.

11. The method of claim 10 wherein the application version changes in response to at least one of the actions comprising an upgrade of said one of the plurality of services, a downgrade of said one of the plurality of services, and a configuration change affecting an operation of said one of the plurality of services.

12. The method of claim 1 wherein the change comprises a transition between an inactive state and an active state of one of the plurality of services.

13. The method of claim 1 wherein:
   the application is any one of a language translation application, a format translation application, a content filtering application, an advertisement insertion application, a content adaptation application, and a virus check application; and
   the distributed requests are requests for content transformation.

14. A method of operating a load balancing node on a network, the method comprising:
   maintaining a current list of application versions associated with a plurality of services running a plurality of instances of a content adaptation application, each application version within the current list of application versions being run by at least one of the plurality of services;
   maintaining a set of participating services selected from the plurality of services, each service within the set of participating services running a preferred application version from the current list of application versions and being in an active state, the preferred application version being associated with a maximum number of votes;
   balancing a distribution of content adaptation requests between the set of participating services; and
   periodically updating the set of participating services to adjust to at least one of a number of events including a change of an application version run by any of the plurality of services and a change in a current state of any of the plurality of services.

15. The method of claim 14 further comprising:
receiving data identifying a current application version of each of the plurality of services.

16. The method of claim 14 further comprising:
determining that said each service within the set of participating services is presently in the active state upon sending a network packet to said each service within the set of participating services and receiving a response from said each service within the set of participating services.

17. The method of claim 14 wherein periodically updating the set of participating services further comprises:
selecting a new preferred application version from the current list of applications versions; and
identifying one or more of the plurality of services that run the new preferred application version and are presently in the active state.

18. The method of claim 17 wherein selecting a new preferred application version comprises:
calculating, for each application version within the current list of application versions, a total number of votes assigned to one or more services that run said each application version; and
finding a winning application version with a maximum number of votes.

19. The method of claim 18 further comprising:
finding two or more winning application versions;
determining whether an existing preferred application version is among the two or more winning application versions; and
considering the existing preferred application version to be the new preferred application version if the existing preferred application version is among the two or more winning application versions.

20. The method of claim 18 further comprising:
determining that the existing preferred application version is not among the two or more winning application versions; and
selecting any one of the two or more winning application versions to be the new preferred application version.

21. The method of claim 14 wherein the content adaptation application is any one of a language translation application, a format translation application, a content filtering application, an advertisement insertion application, a content adaptation application, and a virus check application.

22. The method of claim 14 wherein the load balancing node is coupled to a caching device.

23. A device to operate as a node on a network, the device comprising:
an event detector to receive information from a plurality of services running a plurality of instances of an application and to detect a change of at least one of the plurality of services;
a version monitor to maintain data identifying current application versions associated with the plurality of services using the information;
a version selection algorithm to select a new preferred application version based on the data identifying current application versions upon detecting the change of at least one of the plurality of services by the event detector;
a service list controller to identify one of more of the plurality of services that run the new preferred application version; and a request distributor to balance a distribution of requests between the one or more of the plurality of services that run the new preferred application version.

24. The device of claim 23 wherein the data identifying current application versions includes a list of current application versions.

25. The device of claim 23 wherein the version monitor is to include a current application version of said each of the plurality of services into the list of current application versions, and to determine that said each of the plurality of services is in an active state.

26. The device of claim 24 wherein the version selection algorithm is to select the new preferred application version by assigning one or more votes to each of the plurality of services that runs an application version from the list of current application versions and is currently in an active state, determining, for each application version within the list of current application versions, a total number of votes assigned to services associated with said each application version, and searching for a winning application version with a maximum number of corresponding votes.

27. The device of claim 23 wherein the event detector is to detect the change by detecting that an application version run by one of the plurality of services has changed.

28. The device of claim 23 wherein the event detector is to detect the change by detecting that one of the plurality of services has transitioned between an inactive state and an active state.

29. A device to operate as an intermediary node on a network, the device comprising:
a processor;
a network interface to allow the device to communicate on the network; and
a storage facility to store program code for execution by the processor to cause the device to
maintain data identifying current application versions associated with a plurality of services running a plurality of instances of an application, each of the plurality of services being accessible to the device via a network,
select a new preferred application version based on the data identifying current application versions upon detecting a change of at least one of the plurality of services,
identify one or more of the plurality of services that run the new preferred application version, and
balance a distribution of requests between the one or more of the plurality of services that run the new preferred application until detecting a next change of at least one of the plurality of services.

30. The device of claim 29 wherein the program code is further to cause the device to receive data identifying a current application version of each of the plurality of services.

31. The device of claim 29 wherein the data identifying current application versions includes a list of current application versions.

32. The device of claim 31 wherein the program code is to cause the device to select the new preferred application version by assigning one or more votes to each of the plurality of services that runs an application version from the list of current application versions and is currently in an active state, determining, for each application version within the list of current application versions, a total number of votes assigned to services associated with said each application version, and searching for a winning application version with a maximum number of corresponding votes.

33. The device of claim 29 wherein:
- the application is any one of a language translation application, a format translation application, a content filtering application, an advertisement insertion application, a content adaptation application, and a virus check application; and
- the distributed requests are requests for content transformation.

34. A device to operate as a load balancing node on a network, the device comprising:
- a version monitor to receive data from a plurality of services running a plurality of instances of a content adaptation application and to maintain a current list of application versions associated with the plurality of services, each application version within the current list of application versions being run by at least one of the plurality of services;
- a service list controller to maintain a set of participating services selected from the plurality of services, each service within the set of participating services running a preferred application version from the current list of application versions and being in an active state, the preferred application version being associated with a maximum number of votes;
- a request distributor to balance a distribution of content adaptation requests between the set of participating services; and
- an event detector to detect at least one of a number of events including a change of an application version run by any of the plurality of services and a change in a current state of any of the plurality of services, and to trigger an update of the set of participating services in accordance with the detected event.

35. The device of claim 34 further comprising:
- a version selection algorithm to select a new preferred application version from the current list of applications versions, the service list controller identifying one or more of the plurality of services that run the new preferred application version and are presently in the active state to update the set of participating services.

36. The device of claim 35 wherein the version selection algorithm is to select a new preferred application version by calculating, for each application version within the current list of application versions, a total number of votes assigned to one or more services that run said each application version, and finding a winning application version with a maximum number of votes.

37. The device of claim 34 wherein the content adaptation application is any one of a language translation application, a format translation application, a content filtering application, an advertisement insertion application, a content adaptation application, and a virus check application.

38. The device of claim 34 wherein the load balancing node is coupled to a caching device.

39. A device to operate as a load balancing node on a network, the device comprising:
- a processor;
- a network interface to allow the device to communicate on the network; and
- a storage facility to store program code for execution by the processor to cause the device to
- maintain a current list of application versions associated with a plurality of services running a plurality of versions of a content adaptation application, each application version within the current list of application versions being run by at least one of the plurality of services;
- maintain a set of participating services selected from the plurality of services, each service within the set of participating services running a preferred application version from the current list of application versions and being in an active state, the preferred application version being associated with a maximum number of votes;
- balance a distribution of content adaptation requests between the set of participating services; and
- periodically update the set of participating services to adjust to at least one of a number of events including a change of an application version run by any of the plurality of services and a change in a current state of any of the plurality of services.

40. The device of claim 39 wherein periodically updating the set of participating services further comprises:
- selecting a new preferred application version from the current list of applications versions; and
- identifying one or more of the plurality of services that run the new preferred application version and are presently in the active state.

41. The device of claim 40 wherein selecting a new preferred application version comprises:
- calculating, for each application version within the current list of application versions, a total number of votes assigned to one or more services that run said each application version; and
- finding a winning application version with a maximum number of votes.

42. The device of claim 39 wherein the load balancing node is coupled to a caching device.

* * * * *